United States Patent [19]

Upender et al.

[11] Patent Number: 5,854,454
[45] Date of Patent: Dec. 29, 1998

[54] MESSAGE ROUTING IN CONTROL AREA NETWORK (CAN) PROTOCOL

[75] Inventors: Bhargavender P. Upender, Middletown; David C. Brajczewski, Vernon; Alexander G. Dean, Glastonbury; Stephen A. Hatzirallis, Farmington, all of Conn.

[73] Assignee: Otis Elevator Company, Farmington, Conn.

[21] Appl. No.: 714,647

[22] Filed: Sep. 16, 1996

[51] Int. Cl.$^6$ .............................. B66B 1/28; H04Q 5/22; G01R 31/08
[52] U.S. Cl. ...................... 187/247; 340/825.52; 370/229
[58] Field of Search ..................... 187/247, 391; 340/370, 825.52, 825.53; 370/229, 235, 250

[56] References Cited

U.S. PATENT DOCUMENTS

| | | | |
|---|---|---|---|
| 4,497,391 | 2/1985 | Mendelsohn et al. | 187/29 R |
| 4,742,893 | 5/1988 | Otala et al. | 187/121 |
| 5,387,769 | 2/1995 | Kuperschmith et al. | 187/248 |
| 5,502,818 | 3/1996 | Lamberg | 395/200.16 |
| 5,551,053 | 8/1996 | Nadolski et al. | 359/829 |
| 5,654,531 | 8/1997 | Farbee et al. | 187/247 |

OTHER PUBLICATIONS

"CAN: Controller Area Network", 4 pages. http://www.docs.uu.se/~ken/CAN.html undated.

"The Basic CAN Protocol", 2 pages, Mar. 3, 1995 http://www.docs.uu.se/~ken/rt course/can/node2.html.

*Primary Examiner*—Robert Nappi

[57] ABSTRACT

A hierarchial elevator control system (FIG. 2) utilizes standard Control Area Network (CAN) hardware and message protocols. A broadcast message format includes priority bits and source address bits in subfields within the standard CAN message identifier field, to separate priority levels from message type information, while maintaining collision avoidance by means of the source addresses. In a unicast message format, message response by individual receiving nodes is accomplished with simple standard CAN hardware filtering by providing, within the standard CAN message identifier field, a multi-bit destination address field to identify a unique receiving node to which the message is directed. In the unicast format, remote transmission requests are identified by a control bit in the standard CAN data field, and responded to utilizing a message-type field that is also in the data field portion of the message.

4 Claims, 3 Drawing Sheets

MESSAGE ROUTING IN CONTROL AREA NETWORK (CAN) PROTOCOL

TECHNICAL FIELD

This invention relates to an extension of the Control Area Network (CAN) message protocol to provide routing of messages between hierarchial layers in an elevator control communication network.

BACKGROUND ART

It is well known that elevator systems employing multiple elevators typically will have a plurality of elevators arranged in a group, there being several groups within the building. In commonly owned U.S. Pat. No. 5,387,769, there is disclosed an elevator control local area network which includes a building control connected to a building bus, a plurality of group controls connected to a group bus, which is connectable with the building bus by means of bridge controllers, and a plurality of car buses, one for each elevator, each connectable to the group bus by bridge controllers. Communication among all the nodes on each car bus, group bus and building bus is accomplished with a single communications protocol by means of communications coprocessors each having a transmitter and a receiver.

In commonly owned U.S. Pat. No. 5,202,540, the use of distributed processing to achieve group control functions utilizing processors of individual elevators is disclosed. The ability to utilize processors of one elevator to perform functions for another elevator and/or to perform group functions is a highly desirable feature. Such systems require a significant amount of communications hardware. Therefore, use of industry standard, readily available hardware would be an advantage.

A recent innovation in local area networks is the Control Area Network (CAN) standard, the basic level of which is identified in ISO 11898 and ISO 11519-1. The CAN standard was originally developed to satisfy distributed real-time control needs in automotive applications. As a result, manufacturers such as Intel, Phillips, National Semiconductor, Nippon Electric Company, Siemens and Motorola provide very low cost CAN chips which conform to the protocol. The use of CAN technology has been extended to other custom applications, including industrial control applications. Various application layers have been developed with specifications specifically oriented to industrial and process control applications, control networks for heavy duty trucks and buses, distributed control systems and control networks for cars. However, all of these systems are limited to inter-node communication, and will not support hierarchial networks of the type shown in the aforementioned '769 patent. These prior applications have services oriented toward master/servant communications, which are of no value in a peer-based system, such as in said patent. Such systems also waste computing resources on connection based networks and on product specifications (to ensure operability with products of different manufacturers), none of which are relevant to the elevator application of said patent. Further, many of the application layers referred to hereinbefore have message addressing which is too limited for elevator applications which inherently have many nodes capable of transmitting the same types of messages. Therefore, the existing CAN protocols do not effectively allow taking advantage of CAN processor chips in hierarchial elevator communication networks.

One of the problems with the CAN protocol is with the collision protocol, which is bit wise comparison from highest order to lowest order, with zero winning, whereby the message having an identifier field with the lowest binary value will win the priority race. The utilization of arbitration involving a 29-bit identifier requires a very complicated priority system having over 500 million levels of priority.

In the CAN protocol, the same identifier field is filtered by each receiving node to determine its interest in any given message. Messages that pass through the filter are received and those that do not are ignored. The CAN protocol is a broadcast type system, where messages are simply laid on the bus, and those receiving nodes which should receive any given messages has filtering adjusted accordingly.

Another problem is that priority based on message type cannot be changed during the life of the system.

DISCLOSURE OF INVENTION

Objects of the invention include provision of a CAN protocol which will support hierarchial communications between many nodes, between nodes capable of transmitting same message types, and having a minimum amount of unnecessary protocol elements which are irrelevant to hierarchial elevator communication systems, and which therefore would waste undue amounts of processor time. Other objects of the invention include improvements in a CAN protocol which provides certain priority without a burdensome, minuscule priority message typing scheme, in which message priorities are easily adjusted, and which simplifies utilization of CAN filtering hardware.

This invention is predicated in part on separating priority from bus arbitration. This invention is also predicated in part on use of CAN protocol filtering to recognize message destinations independently of message type.

In accordance with the invention, a message protocol adapted for use with standard CAN hardware employs one or more of the highest order bits in the identifier field of a message to establish the priority level of messages, the remaining identifier field including, in all cases, a source address, each of which is completely unique in the entire system, thereby assuring that collision avoidance will occur as between messages of a same priority, utilizing the CAN collision avoidance protocol, while at the same time providing extremely simple priority which has only a necessary few levels.

According to the invention, the identifier field of a standard CAN message includes, in broadcast messages having no specific destination, a message type sub-field which permits all of the receiving nodes to utilize standard can filtering protocols to determine if they are interested in a message, or not, based on its source as well as its type.

In further accord with the invention, the identifier field of a standard CAN message includes a destination address sub-field in unicast messages, the address of the intended receiver being recognized only by the filtering protocol practiced at that receiver. This aspect of the invention permits utilization of the standard CAN hardware and CAN protocol to provide message routing in hierarchial, multi-layered bus systems.

The invention provides a low cost solution to message handling in elevator systems, which are hierarchial, which have safety concerns that require assurance of priority message delivery, and which must communicate many different message types among many system nodes.

Other objects, features and advantages of the present invention will become more apparent in the light of the following detailed description of exemplary embodiments thereof, as illustrated in the accompanying drawing.

Best Mode for Carrying Out the Invention

Figure 1:
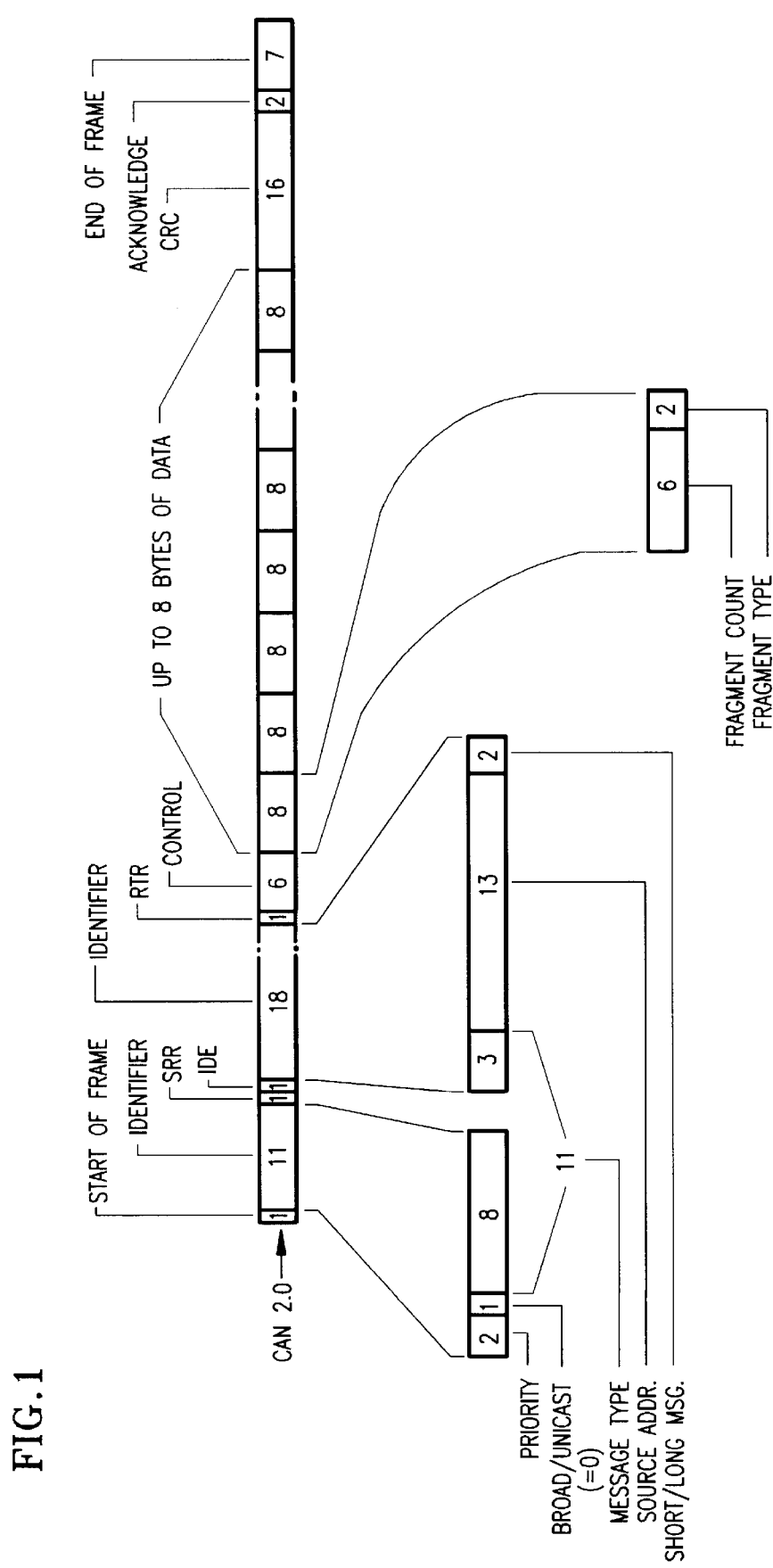
FIG. 1 is a diagram illustrating a standard CAN message format for implementing the CAN protocol, and modifications to the standard CAN format which implement the protocol of the present invention in a broadcast-type transmission.

The upper part of FIG. 1 illustrates the standard CAN 2.0 message format in which the highest ordered bit is a start of frame bit, and the next 11 bits are part of an arbitration or identifier field, followed by a substitute remote request (SRR) bit and an identifier extension (IDE) bit. Then there are 18 more bits of the identifier field. The identifier field serves two functions in the protocol. The first function is collision avoidance which is achieved by having the zero-value of any bit dominant over the one-value; any transmitter which transmits a one but senses a zero on the bus realizes that another transmitter, having a higher priority in the collision avoidance protocol, is transmitting, and ceases to transmit. The second function of the identifier is to allow all of the receivers to be programmed to examine the identifier by means of filters, and receive only those messages which pass through the filter at such receiver. Each receiver is altered in accordance with the manner in which the protocol is used in any given system by having bit masks set to define it. It may be noted that the CAN 1.0 protocol includes only 11 bits in the identifier field, providing over 2300 levels of priority; in the CAN 2.0 protocol a 29-bit identifier field provides, if used in that fashion, over 500 million levels of priority. The present invention is primarily addressed to these two features.

The CAN 2.0 message format includes, following the 29 bits of identifier fields, a remote transmission request (RTR) bit, a six bit field of control bits, up to eight, 8-bit bytes of data, a 16-bit cyclic redundancy check, a pair of acknowledge bits, and a seven-bit end of frame field. In the broadcast type transmission of FIG. 1, the data field (up to 64 bits) is used for actual data unless more than 8 bytes of data are required, in which case multiple messages are transmitted and the highest order byte is utilized, as shown in the lower right hand corner of FIG. 1, to identify, in multiple messages, the parameters of a moving window multiple message protocol known to the prior art. This includes a six-bit fragment count, and two bits which indicate the fragment type, including a start message, all the interim middle messages, and finally an end message. This is known to the art and forms no part of the present invention, but is included here for completeness.

According to the invention, in a broadcast type message, the standard CAN 2.0 identifier field of 29 bits is formulated as shown in the lower left of FIG. 1. One aspect of the present invention is to eliminate the need to have all of the possible messages identified and arranged in accordance with the priority messages will result from utilizing the high order, zero-value-dominance, collision avoidance scheme to achieve priority. In an elevator system, only a few levels of priority are required, and need to be easily changed from one to another. In the present example, there are only four levels of priority which are identified by the highest-ordered two bits of the identifier field. These two bits establish priority as set forth in Table 1.

TABLE 1

| Message Priority | Priority Category | Typical Message Delivery Time | Typical Message Type |
| --- | --- | --- | --- |
| 00 | Ultra High | <10 MS | Safety |
| 01 | High | <100 MS | Time-critical |
| 10 | Medium | <1 Sec | Time-noncritical |
| 11 | Low | <10 Sec | Very long messages |

Since collision avoidance continues from high order to low order throughout the identifier field, the next bit of the protocol of the invention will also affect message priority since it identifies whether the message is a broadcast type message, being addressed to no one and everyone, or a unicast type message having a particular destination address unique to a receiver which must receive the message. In the case of the protocol of FIG. 1, a broadcast type message is shown and therefore the broadcast/unicast bit will be set to zero, as shown. Thus, if a broadcast type message collides with a unicast type message of the same priority level, the unicast type message will cease to be transmitted in favor of the broadcast type message, since zero dominates over one.

The next 11 bits of the identifier field in accordance with the invention comprise the message type. The message type can vary significantly, and in the protocol of the present invention, need not be formatted in any fashion to accommodate a priority scheme. That is to say, within any one priority level shown in Table 1, any message type can win or lose in the collision avoidance protocol, without affecting operation of the system. Therefore, formatting of the message types can be done with no consideration whatsoever to the effect of that format in collision avoidance. In fact, it is very possible to have messages simultaneously broadcast which are of the same priority, both broadcast type messages, and of the same message type. Collision avoidance will, however, be achieved by virtue of a source address field of 13 bits which follows the message type field. In the protocol of the invention, each source has a unique address and therefore one of them will prevail in the collision avoidance protocol.

The lowest-order two bits of the identifier field are used to flag the case when a long message is being sent, as described hereinbefore.

Figure 2:
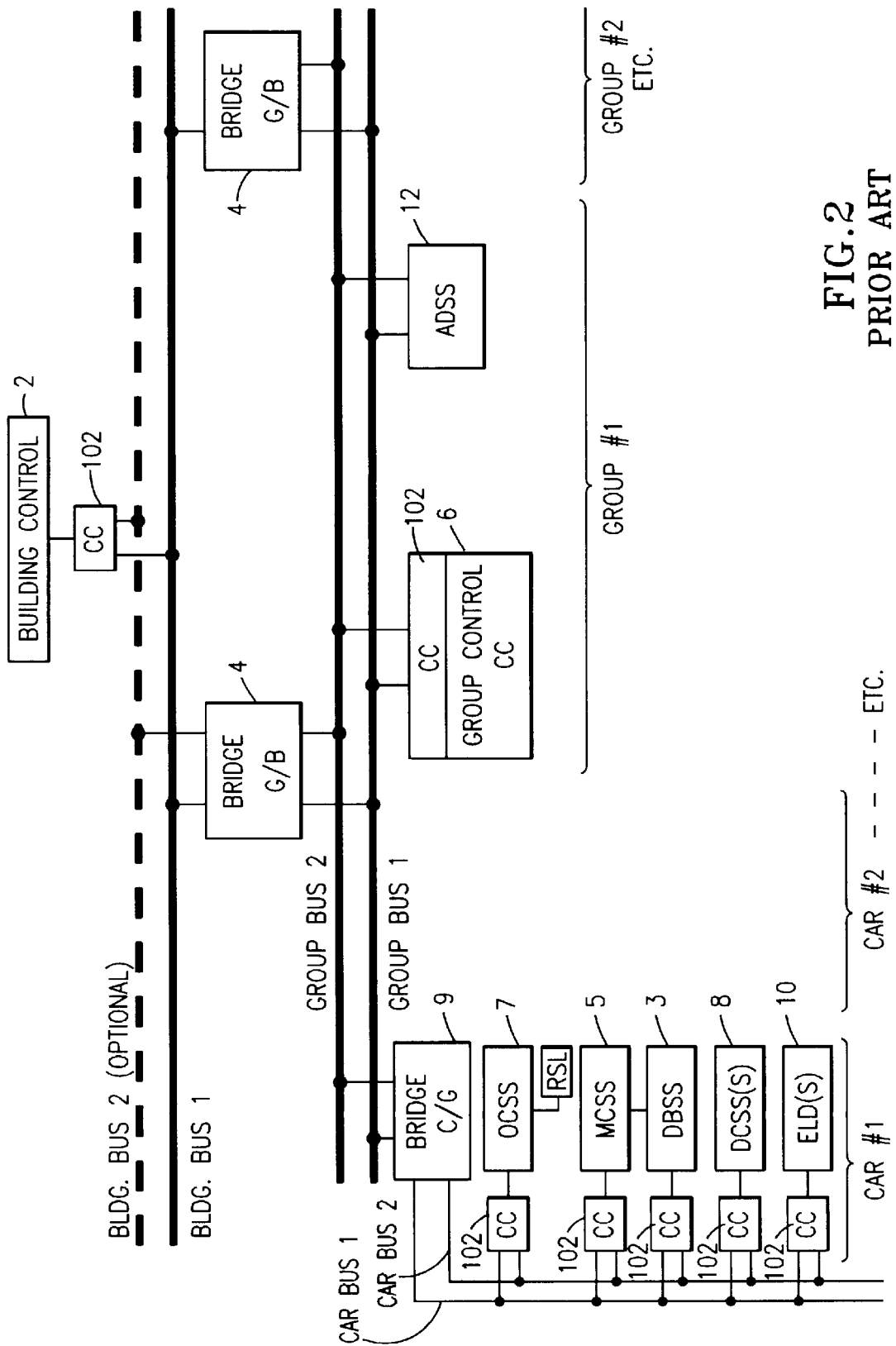
FIG. 2 is a simplified schematic block diagram of a multi-level, multi-bus, hierarchial communication system for use with elevators, known to the prior art, which serves as an example of utility for the protocol of the present invention.

Referring now to FIG. 2, a hierarchial elevator system of the prior art includes a plurality of redundant buses: BLDG. BUS 2, BLDG. BUS 1; GROUP. BUS 2, GROUP BUS 1; CAR BUS 1, CAR BUS 2. The buses are connected to functional transceiver nodes by communication coprocessors 102. A building control 2 is connected to the building buses, for coordinating the dispatching of groups of elevators, as opposed to coordinating dispatching of elevators within a group, and for other elevator system purposes such as diagnostics. A plurality of G/B bridges 4 connect the building buses with the group buses. A group control 6, and an advance dispatching subsystem 12, which performs some of the group control functions in accordance with the teachings of commonly owned U.S. Pat. No. 4,497,391, are both connected to the group bus. Other groups are similarly connected to the group bus, as indicated. A car to group (C/G) bridge 9 interconnects the group with the elements of a single elevator car by means of the car buses. These include an operational control subsystem 7, including a remote serial link (RSL) which may connect to the car operating panel (call buttons, lights and other switches), not shown. A motion control subsystem 5 may be directly connected to a related drive and brake subsystem 3, in addition to being connected to the car buses. Other elements are one or more door control subsystems 8 and one or more electroluminescent displays 10.

Among the various processors that are connected through the communication coprocessors 102 to the various buses, some are sophisticated and some are quite simple. For instance, the OCSS 9 may be quite sophisticated with a high performance processor. On the other hand, an ultra-low cost node may consist of a simple digital state machine, or a small processor, such as the ELDs 10. In the CAN protocol, filtering the message identifier field (essentially the message type) utilizing the broadcast format of FIG. 1 will require a very complicated scheme of message identification, which is unalterable and incapable of change to suit configurational requirements. With the help of software, the filtering of message types can become effective. However, use of software to assist in the filtering will require an interrupt for each message, which consumes processing capability. For simple, unsophisticated nodes, the burden of interrupt handling for incoming message recognition can be disabling.

Figure 3:
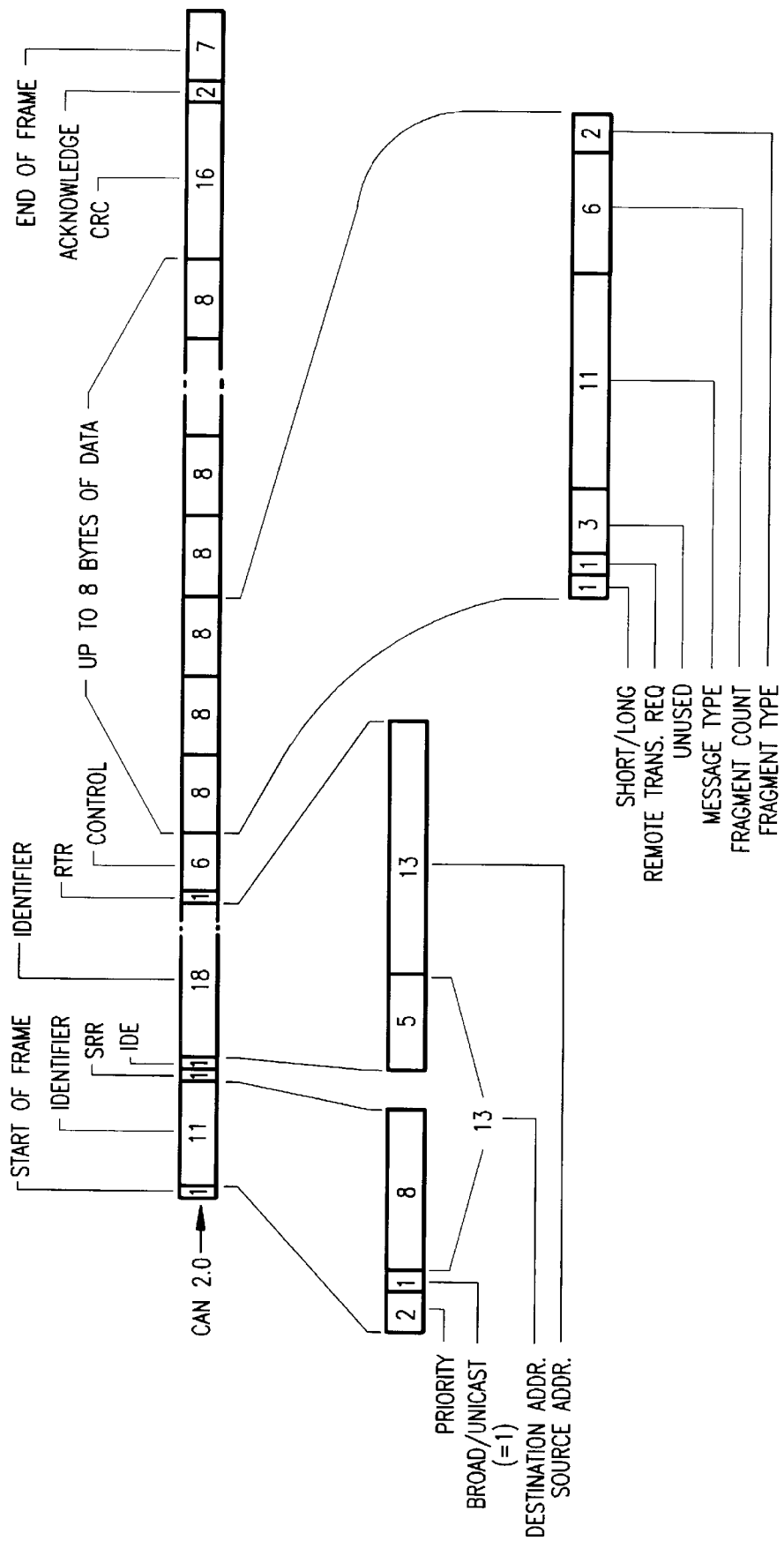
FIG. 3 is a diagram illustrating a standard CAN message format for implementing the CAN protocol, and modifications to the standard CAN format which implement the protocol of the present invention in a unicast-type transmission.

To overcome this difficulty, and to allow utilizing simple hardware (or software) filtering for receiver message recognition, the invention also provides for a unicast type message which includes a destination address. In FIG. 3, the identifier field includes a broadcast/unicast bit set to one, indicating that the message is in the unicast format, in contrast with the broadcast format of FIG. 1. In this format, the remainder of the identifier field includes a destination address of 13 bits along with a source address of 13 bits. The source address consists of the 13 lowest ordered bits of the identifier field, and therefore it is most likely that collision avoidance of simultaneously transmitted unicast messages of the same priority will be determined by comparing destination addresses; but of course, if two are destined for the same address, then the source address will determine the collision avoidance. In collision avoidance between simultaneously transmitted unicast and broadcast messages of the same priority, the broadcast message will always win since the broadcast message is identified with a dominant zero in the third from highest ordered bit. Therefore, there will be no comparison between the message type and the destination address as between two different-type messages. However, as far as priority is concerned, all of this is irrelevant because the priority which is required is accommodated in the first two bits as shown in Table 1.

The unicast message format of FIG. 3, including a destination address, makes it possible to have extremely simple hardware filtering for any of the nodes in the system, in accordance with the invention.

Because of the fact that the unicast format of FIG. 3 utilizes the bulk of the identifier field for source and destination addresses, the other functions (message type and short or long message designation) found in the identifier field in the broadcast type message of FIG. 1, must be accommodated in the data bytes in the unicast message of FIG. 3. The first three data bytes are utilized for control purposes in the unicast message of FIG. 3. The highest ordered bit identifies whether the message is a short or long message. If the bit is one, it is a long message, and the fragment count and fragment type which are in the highest ordered data byte of a broadcast-type message are found in the third-highest ordered data byte of a unicast-type message. Additionally, remote transmission requests, which in CAN are handled by the RTR bit following the identifier field (FIG. 1), cannot be so handled in the unicast format of FIG. 3. The processing in accordance with the CAN protocol relates to broadcast type messages (as all CAN messages are) and utilizes bits of the identifier to determine the type of message being requested. In the unicast format of FIG. 3, the "identifier" bits involved are address bits, and therefore cannot be used for remote transmission requests. Instead, the remote transmission request identified by the second most significant bit of the highest ordered data byte is used in the unicast format of FIG. 3, and through software, the message type request relates to the message type field of 11 bits comprising the three least significant bits of the highest ordered byte and the entire next to highest ordered byte of the data field, as shown in FIG. 3. Thus, unicast messages which allow utilization of simple hardware filtering to determine which receiving nodes actually receive a message are achieved by providing destination addresses within the identifier field, and accommodating remote transmission requests by elements in the data field. In order to ensure proper functioning in the unicast format, the RTR bit within the four bit control field must, of course, always be set to zero in the unicast format, as shown in FIG. 3.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of communicating between various nodes of a multi-processor control system, utilizing control area network (CAN) hardware which responds to a standard CAN message format in which the most significant bit is a start of frame bit, the next 31 most significant bits include a 29-bit identifier field, the next bit comprises a remote transmission request bit, the next six bits comprise a field of control bits, the next field of between 8 and 64 bits comprises a data field, the next 16 bits comprise a cyclic redundancy check field, the next 2 bits comprise an acknowledge field, and the least significant seven bits comprise an end of frame field, which method comprises:

providing a priority field consisting of a fraction of said CAN identifier field including the most significant bits of said identifier field, the content of which will determine a particular one of a plurality of priority levels, whereby standard CAN bus arbitration, by high order to low order zero dominance bit-wise comparison collision avoidance, effects transmission of a message of a higher priority one of said priority levels rather than a message of a lower priority one of said priority levels; and providing, as a plurality of other bits in said CAN identifier field, a multi-bit source address uniquely identifying the source of any message in said system, whereby collision avoidance as between messages having the same priority level is carried out by said standard CAN bus arbitration.

2. A method according to claim 1 further comprising:

providing a message type field in a plurality of bits of said standard CAN identifier field, whereby standard CAN filtering may be utilized at each receiving node of said system to determine whether said receiving node should receive said message based upon the type of message and its source.

3. A method according to claim 1 further comprising:

providing, in said standard CAN identifier field, a destination address field comprising a plurality of bits, whereby standard CAN filtering hardware may be utilized by each receiving node of said system to determine whether a particular message should be received by said system in response to said bits of said destination address field.

4. A method according to claim 3 further comprising:

providing in said standard CAN data field a message-type field comprising a plurality of bits.

* * * * *